(12) United States Patent
Zhang et al.

(10) Patent No.: US 12,506,829 B2
(45) Date of Patent: Dec. 23, 2025

(54) MOBILE TERMINAL

(71) Applicant: Honor Device Co., Ltd., Shenzhen (CN)

(72) Inventors: Shaohui Zhang, Shenzhen (CN);
Yongchao Bie, Shenzhen (CN);
Yongqiang Zang, Shenzhen (CN);
Guoliang Huo, Shenzhen (CN);
Lizhong Huang, Shenzhen (CN); Tao Yang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 356 days.

(21) Appl. No.: 18/044,316

(22) PCT Filed: Aug. 17, 2021

(86) PCT No.: PCT/CN2021/112899
§ 371 (c)(1),
(2) Date: Mar. 7, 2023

(87) PCT Pub. No.: WO2022/052748
PCT Pub. Date: Mar. 17, 2022

(65) Prior Publication Data
US 2023/0336649 A1  Oct. 19, 2023

(30) Foreign Application Priority Data

Sep. 9, 2020 (CN) .......................... 202010940986.6

(51) Int. Cl.
*H04M 1/23* (2006.01)
*H04M 1/02* (2006.01)

(52) U.S. Cl.
CPC ......... *H04M 1/236* (2013.01); *H04M 1/0266* (2013.01)

(58) Field of Classification Search
CPC ...................................................... H04M 1/236
See application file for complete search history.

(56) References Cited

U.S. PATENT DOCUMENTS

| 10,910,170 B2 | 2/2021 | Choi et al. | |
|---|---|---|---|
| 2008/0014787 A1* | 1/2008 | Kim ...................... | G06F 1/1686 439/517 |

(Continued)

FOREIGN PATENT DOCUMENTS

| CN | 203691479 U | 7/2014 |
|---|---|---|
| CN | 205487860 U | 8/2016 |

(Continued)

*Primary Examiner* — Wen W Huang
(74) *Attorney, Agent, or Firm* — Conley Rose, P.C.

(57) ABSTRACT

A mobile terminal includes: a housing having a side wall that is provided with an accommodation cavity, where the accommodation cavity has a first side wall and a second side wall, the first side wall is provided with an avoidance groove, and the avoidance groove is disposed on a side of the first side wall close to the accommodation cavity and is in communication with the accommodation cavity; a display screen, mounted in the housing; and a trigger portion that at least partly protrudes into the accommodation cavity and is movably connected to the accommodation cavity, where the trigger portion includes a cable board, where the avoidance groove is configured to accommodate the cable board.

20 Claims, 4 Drawing Sheets

(56) References Cited

U.S. PATENT DOCUMENTS

| | | | | |
|---|---|---|---|---|
| 2010/0053861 | A1* | 3/2010 | Kim | H04M 1/22 |
| | | | | 250/206 |
| 2011/0140932 | A1* | 6/2011 | Chen | H04M 1/236 |
| | | | | 341/22 |
| 2014/0367237 | A1* | 12/2014 | Taylor | H01H 15/06 |
| | | | | 200/5 A |
| 2016/0233037 | A1* | 8/2016 | Lee | H01H 13/705 |
| 2017/0135239 | A1* | 5/2017 | Hyun | G06F 1/1656 |
| 2020/0100389 | A1 | 3/2020 | Park et al. | |
| 2020/0267863 | A1 | 8/2020 | Kim et al. | |
| 2021/0018388 | A1* | 1/2021 | Seo | G01L 5/0038 |

FOREIGN PATENT DOCUMENTS

| | | |
|---|---|---|
| CN | 206212063 U | 5/2017 |
| CN | 108023994 A | 5/2018 |
| CN | 108282976 A | 7/2018 |
| CN | 108335933 A | 7/2018 |
| CN | 207884682 U | 9/2018 |
| CN | 210670227 U | 6/2020 |
| CN | 212752858 U | 3/2021 |
| EP | 3340264 A1 | 6/2018 |
| JP | 2015012563 A | 1/2015 |

* cited by examiner

MOBILE TERMINAL

CROSS-REFERENCE TO RELATED APPLICATIONS

This application is a U.S. National Stage of International Application No. PCT/CN2021/112899, filed on Aug. 17, 2021, which claims priority to Chinese Patent Application No. 202010940986.6, filed on Sep. 9, 2020, both of which are incorporated herein by reference in their entireties.

TECHNICAL FIELD

This application relates to the field of electronic product technologies, and in particular, to a mobile terminal.

BACKGROUND

With the application of side-wall fingerprint components in mobile phone products, and competitive requirements for thin mobile phones, narrow black borders of screens, and large batteries and high battery life, the requirements for mobile phone housings to resist bending are increasingly high, so that high-strength, high-toughness and bending-resistant materials (for example, high-strength and high-toughness die-casting aluminum alloys) come into being, and the costs are increased accordingly. To reduce the costs, on the basis of using an original material of a mobile phone housing, in order to avoid a case that a fingerprint component mounted on the side wall reduces the bending strength of the side wall in a thickness direction H, a design of widening/heightening a vertical wall (a part of the side wall of the mobile phone housing) of a battery compartment is used at the position of the side fingerprint, to ensure the bending resistance of the mobile phone. This widening/heightening design either sacrifices the competitiveness of the narrow black border, or squeezes out the battery space, resulting in worse battery life experience.

SUMMARY

This application is intended to provide a mobile terminal, which can provide a mobile phone housing with higher bending strength in a limited space, reduce the costs, facilitate thinning of a mobile phone, and reduce a black border of a screen.

This application provides a mobile terminal, including:
a housing, where a side wall of the housing is provided with an accommodation cavity, and the accommodation cavity has a first side wall and a second side wall;
a display screen, mounted in the housing;
a trigger portion, where the trigger portion at least partly protrudes into the accommodation cavity and is movably connected to the accommodation cavity; and
a support component, disposed on at least one of the first side wall or the second side wall, where
the support component is provided with a buffer portion, and there is a preset distance between the buffer portion and the display screen.

While the costs are not increased, that is, the housing of the original material is used, the bending resistance of the side wall of the housing along the thickness direction H can be improved while not increasing the space occupied by other parts of the mobile terminal.

In a possible design, the support component includes a first connection end and a second connection end, and there is an intermediate section between the first connection end and the second connection end;
along a thickness direction H of the housing, the second connection end is configured to connect a bottom wall of the housing, and the first connection end is configured to connect the display screen,
a cross-sectional area of the first connection end is S1, a cross-sectional area of the second connection end is S2, a minimum cross-sectional area of the intermediate section is S3, S3<S1, and S3<S2; and
the buffer portion is formed at a position at which a cross section of the intermediate section is S3.

The cross-sectional area of the corresponding position of the buffer portion is reduced, so that the rigidity of the support component can be improved, and then the connected side wall has better bending resistance.

In a possible design, along the thickness direction H of the housing, a sectional area of the intermediate section gradually increases in a direction from the buffer portion to the first connection end, and the sectional area of the intermediate section gradually increases in a direction from the buffer portion to the second connection end.

Through such an arrangement that the cross-sectional area of the support component gradually increases from the buffer portion at the middle position to two ends, the structural stability of the support component can be improved while ensuring good rigidity.

In a possible design, the shape of the cross section of the support component includes a circle, an ellipse, a quadrangle, a polygon, and a rhombus.

Therefore, requirements of side walls in housings of different specifications can be met, and support components are prevented from protruding from the side walls.

In a possible design, the support component is provided with a recessed portion, and the recessed portion forms the buffer portion.

When the external pressure is transmitted to the position at which the recessed portion is disposed, the change of the cross-sectional area of the position of the recessed portion can increase the bending stress.

In a possible design, along a second direction L, a cross-sectional area of the first side wall is S4, the recessed portion disposed on the first side wall has a cross-sectional area S5, and S5 does not exceed one-third to one-fourth of S4; and
along the second direction L, a cross-sectional area of the second side wall is S6, the recessed portion disposed on the first side wall has a cross-sectional area S7, and S7 does not exceed one-third to one-fourth of S6.

Therefore, when the support component is correspondingly disposed on the first side wall and/or the second side wall, a better support effect can be achieved and the bending resistance of the side wall can be improved.

In a possible design, the support component includes a first section and a second section, and an intermediate section is connected between the first section and the second section; and
along a thickness direction H of the housing, the recessed portion is located between the first section and the second section, the first section is configured as a side wall of the recessed portion near the display screen, the second section is connected to a bottom wall of the housing, a side wall corresponding to the position of the recessed portion is the intermediate section, a length of the intermediate section does not exceed one-fourth of a length of the first section, and a length of the second section is not less than a thickness of the bottom wall.

When being connected to the corresponding side wall, the recessed portion can achieve a better effect, so that the bending resistance of the side wall can achieve better bending resistance.

In a possible design, along a first direction W, the recessed portion is a groove structure provided on a side of the first side wall close to the accommodation cavity, or the recessed portion is a groove structure provided on a side of the second side wall close to the accommodation cavity.

While the bending strength of the corresponding side walls can be improved, the accommodation space of the accommodation cavity can be increased.

In a possible design, the groove structure has an inner wall, and the inner wall is an arc-shaped surface.

To facilitate processing, the inner wall of the groove structure may be disposed as the same arc-shaped surface as a selected cutter, to reduce processing costs.

In a possible design, the support component is disposed on the first side wall and the second side wall; and
along the first direction W, the support component is not overlapped or partially overlapped.

Therefore, the stress can be dispersed, and it is ensured that the matching support component can achieve better bending resistance.

In a possible design, the first side wall is provided with an avoidance groove, the trigger portion includes a cable board, and the avoidance groove is configured to accommodate the cable board; and
the support component is disposed on the second side wall, and along the first direction W, a projection of the avoidance groove on the second side wall can cover at least part of the support component.

The disposed groove structure can be used as a buffer portion to improve the bending strength of the side wall, and can also avoid the cutter, to prevent a first cut being generated when the avoidance groove is processed, improving the structural stability of the housing.

In a possible design, the mobile terminal further includes a reinforcing portion, the reinforcing portion is a groove provided on the first side wall, and the groove is in communication with the avoidance groove; and
in a direction from the accommodation cavity to the first side wall, a recessed depth of the groove is less than a recessed depth of the avoidance groove.

A groove is provided at a position corresponding to a second cut, and the groove is in communication with the avoidance groove, to prevent the cutter from colliding with the first side wall to form the second cut in a process of being drawn out from the avoidance groove, providing a buffer space for the cutter to be drawn out.

In a possible design, along the second direction L, the reinforcing portion does not overlap the support component.

Through the staggered arrangement, the stress is dispersed, avoiding stress concentration that leads to local deformation due to excessive pressure.

In a possible design, the support component is integrally formed with the first side wall, and the support component is integrally formed with the second side wall.

Through integral molding, the stability of the connection between the support component and the side walls is improved, and the support effect of the support component on the side walls is improved, so that the side wall can achieve better bending resistance without increasing own thickness or height, avoiding contact of the display screen with the internal components under pressure.

It should be understood that the foregoing general descriptions and the following detailed descriptions are only exemplary, and cannot limit this application.

REFERENCE NUMERALS

1—Housing; 11—Battery compartment; 12—Bottom wall; 13—Second side wall; 131—Recessed portion; 132—First section; 133—Intermediate section; 134—Second section; 135—First connection end; 136—Second connection end; 14—First side wall; 141—Avoidance groove; 142—Groove; 2—Trigger portion; 21—Bracket; 22—Switch; 23—Accommodation cavity; 24—Through hole; 3—Reinforcing portion; 4—Support component; 5—Display screen; and 6—Volume key.

Accompanying drawings herein are incorporated into the specification and constitute a part of this specification, show embodiments that conform to this application, and are used for describing a principle of this application together with this specification.

DESCRIPTION OF EMBODIMENTS

To better understand the technical solutions of this application, the embodiments of this application are described below in detail with reference to the accompanying drawings.

It should be noted that, the described embodiments are merely some embodiments rather than all the embodiments of this application. All other embodiments obtained by a person of ordinary skill in the art based on the embodiments of this application without creative efforts shall fall within the protection scope of this application.

The terms used in the embodiments of this application are merely for describing specific embodiments, but are not intended to limit this application. The terms "a", "said" and "the" of singular forms used in the embodiments and the appended claims of this application are also intended to include plural forms, unless otherwise specified in the context clearly.

The term "and/or" used in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that nouns of locality such as "above", "below", "left", and "right" described in the embodiments of this application are described from the perspective shown in the accompanying drawings, and should not be construed as a limitation to the embodiments of this application. In addition, in the context, it is further understood that when referring to an element connected "on" or "under" another element, the element may be not merely connected "on" or "under" another element, but also indirectly connected "on" or "under" another element through an intermediate element.

Figure 1:
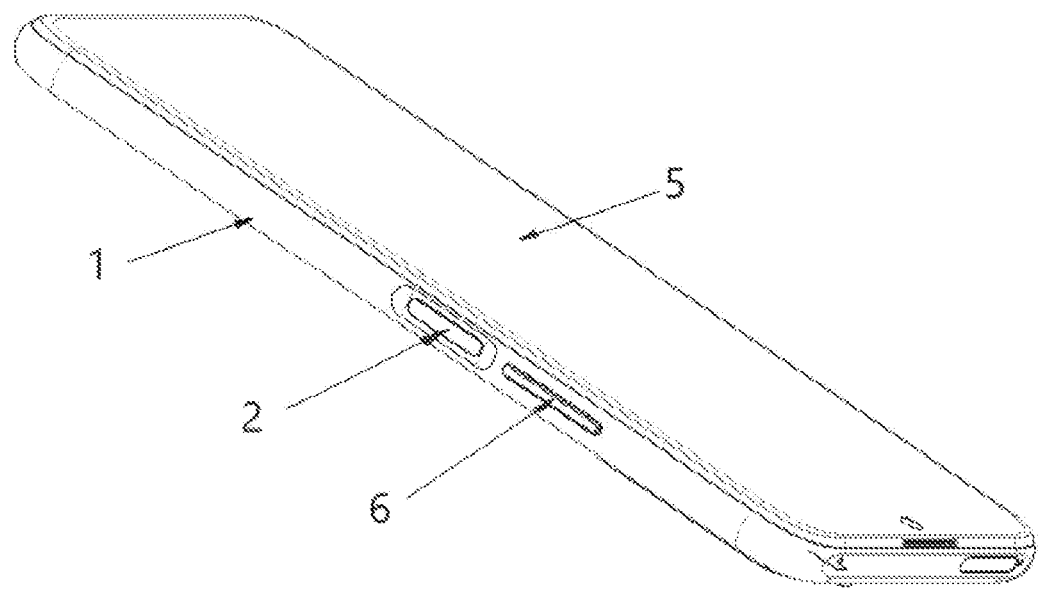
FIG. 1 is a schematic diagram of an overall structure of a mobile terminal according to an embodiment of this application.

An embodiment of this application provides a mobile terminal. As shown in FIG. 1, the mobile terminal includes a housing 1 and a display screen 5. Along a thickness direction H of the housing 1, the housing 1 has a bottom wall 12. The bottom wall 12 may be integrally formed with the housing 1, or may be detachably connected for mounting or disassembling components (for example, batteries) disposed inside the housing 1. A side of the housing 1 away from the bottom wall 12 is used for mounting the display screen 5. The mobile terminal may be a handheld device with a display function, such as a mobile phone, a tablet, or an electronic game console, which is not specifically limited herein.

Figure 2:
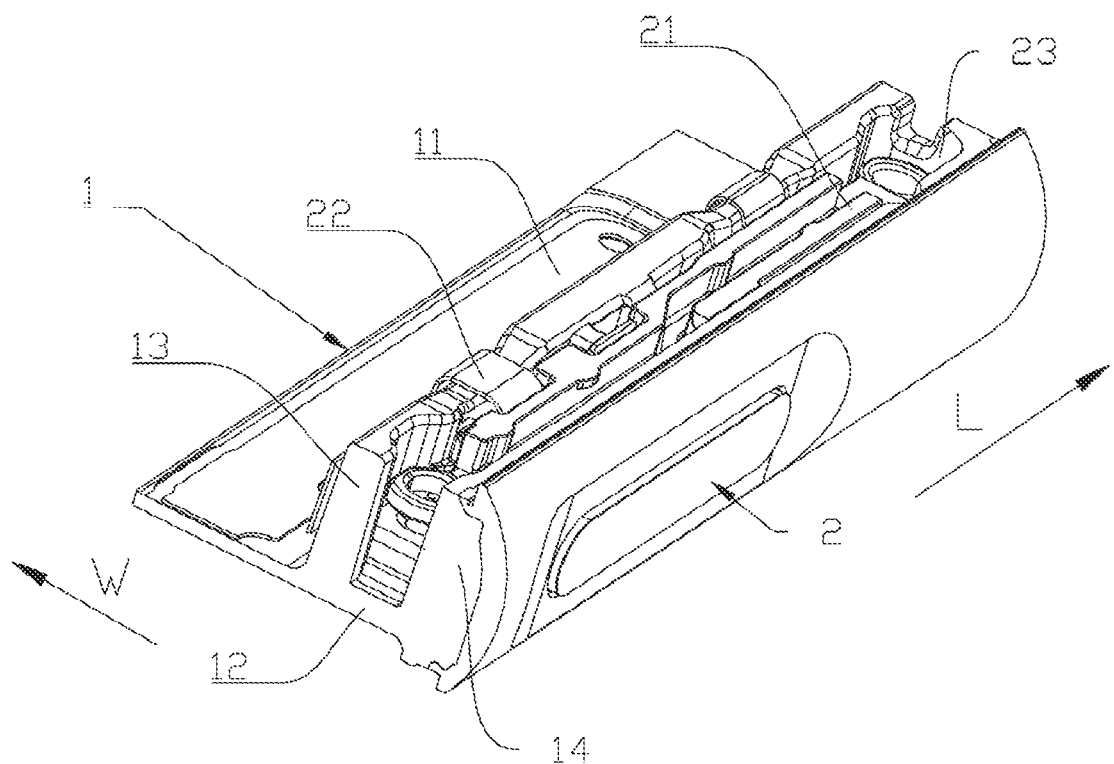
FIG. 2 is a schematic diagram of a partial structure of a position of a trigger portion disposed in a housing of a mobile terminal according to an embodiment of this application, where a direction indicated by an arrow L is a second direction, and a direction indicated by an arrow W is a first direction.

For such a mobile terminal, generally, as shown in FIG. 1 and FIG. 2, a component (for example, a fingerprint component) for device unlocking or locking is mounted on the side wall of the housing 1, and a volume key 6 is also correspondingly disposed on the same side wall of the housing 1. To mount the fingerprint component to implement unlocking or locking of the mobile terminal by pressing the fingerprint component, the side wall of the housing 1 is provided with an accommodation cavity 23. A trigger portion 2 (that is, a component for unlocking or locking) at least partially protrudes into the accommodation cavity 23, and the trigger portion 2 is movably connected to the accommodation cavity 23. Along a first direction W, the accommodation cavity 23 has a first side wall 14 and a second side wall 13, and the second side wall 13 can be used to form a battery compartment 11. Specifically, the first side wall 14 of a part of the side wall provided with the accommodation cavity 23 is provided with a through hole 24 in communication with the accommodation cavity 23, and the trigger portion 2 passes through the through hole 24 and partially protrudes into the accommodation cavity 23. Along the first direction W (for example, the direction indicated by the arrow in FIG. 2), the trigger portion 2 can move relative to the side wall. A switch 22 is disposed on the second side wall 13 on the side opposite to the through hole 24. When the trigger portion 2 is pushed to move along the first direction W until the trigger portion abuts against the switch 22, the display screen 5 can be unlocked after being connected. For the disposed trigger portion 2, when the trigger portion 2 is connected to the side wall, to enable the trigger portion 2 to move along the first direction W close to the switch 22 and reset in the limited space in the accommodation cavity 23, a bracket 21 is rotatably connected in the accommodation cavity 23, the accommodation cavity 23 is provided with a limiting groove, and a rotating shaft rotatably connected to the bracket 21 is disposed in the limiting groove. A groove wall of the limiting groove is used to limit a rotation angle of the bracket 21, so that the rotation of the bracket 21 drives the connected trigger portion 2 to move along the first direction W to a position abutting against the switch 22, and the trigger portion 2 can be reset by the restoring force of the bracket 21. Alternatively, the trigger portion 2 may be movably connected to the bracket 21, and can move relative to the bracket 21 along the first direction W, to push the trigger portion 2 to move to abut against the switch 22. After the pushing force is canceled, the trigger portion 2 can be reset relative to the bracket 21. For the specific matching structure of the trigger portion 2 and the bracket 21, as long as the trigger portion 2 can move in a direction close to or away from the switch 22 along the first direction W to implement unlocking or locking, the specific matching structure is not specifically limited herein.

To control the opening and closing of the mobile terminal through the side fingerprint component, the trigger portion 2 connected to the side wall needs to destroy the integrity of the side wall, and the accommodation cavity 23 is in a form of structural fit that at least forms the first side wall 14 and the second side wall 13. The structural stability of the side wall forming the housing 1 is further reduced. When a mobile terminal is used, an operation such as pressing the display screen 5 is often required to realize the touch function. During operation, when the housing 1 bears a force along a thickness direction H of the housing 1, since the integrity of the side wall of the housing 1 is destroyed, the bending strength thereof along the thickness direction H decreases. Under the action of the force along the thickness direction H, the side wall is easy to deform, and bending deformation is more likely to occur especially at the positions of the first side wall 14 and the second side wall 13. To improve the bending resistance of the side wall of the housing 1, the material of the housing 1 can be replaced with a material with high strength and high toughness, but the cost of the material is relatively high, which is not conducive to the mass production of the housing 1. Alternatively, a design of widening/heightening the first side wall 14 and/or the second side wall 13 may be used, to improve the bending strength of the housing 1, but this method increases the overall volume of the mobile terminal, or the spatial position of other components is occupied in the original limited space, which causes inconvenience in use of other components, and is not conducive to the thin and light design of the mobile terminal.

Figure 4:
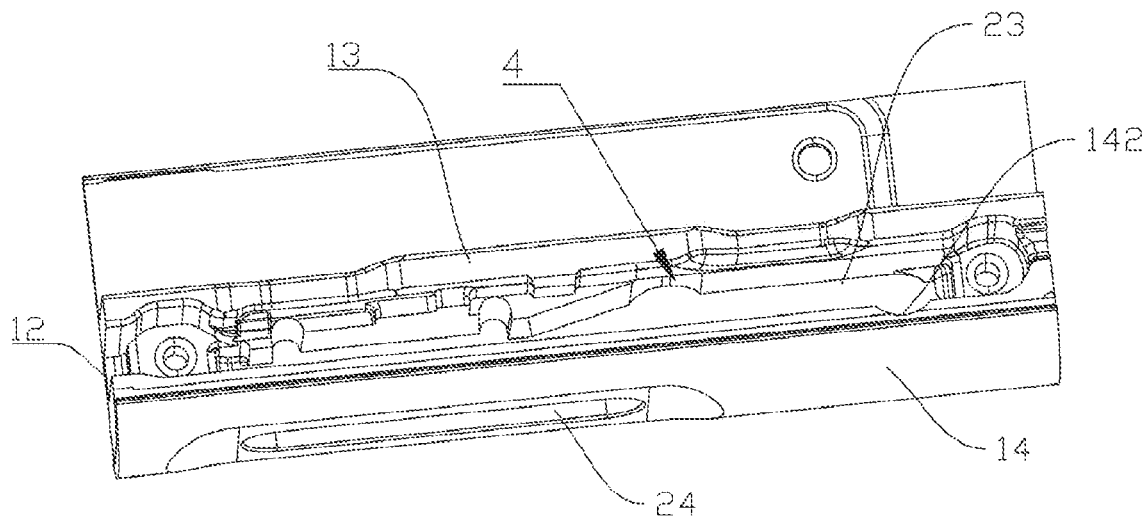
FIG. 4 is a schematic structural diagram of FIG. 2 in another direction with the trigger portion being removed.

Therefore, in order not to increase the cost, that is, to use the housing 1 of the original material, and to improve the bending resistance of the side wall of the housing 1 along the thickness direction H without increasing the space occupied by other parts of the mobile terminal, as shown in FIG. 4, one or more support components 4 are disposed on the side wall. The support component 4 is disposed on the side wall (where the support component 4 is disposed on at least one of the first side wall 14 or the second side wall 13) to increase the bending strength of the corresponding position. In addition, the support component 4 is a structure disposed on the side wall based on the corresponding side wall structure, without additional increase of the height or width of the corresponding side wall, so that the side wall has better bending resistance, and the design of the mobile terminal can be made lighter and thinner.

For the disposed support component 4 to improve the bending strength of the corresponding position when being connected to the corresponding side wall, the support component 4 is provided with a buffer portion. Along the thickness direction H. of the housing 1, there is a preset distance between the buffer portion and the display screen 5. With the arrangement of the buffer portion, after the support component 4 is connected to the corresponding side wall position, the display screen 5 is under pressure and then generates a pressure in the thickness direction H on the side wall connected to the display screen 5. To prevent the side wall from bending under pressure to result in cases such as damage or short circuit since the display screen 5 comes into contact with the components inside the housing 1, the arrangement of the buffer portion can increase the bending resistance of the side wall, to prevent the side wall from bending to cause the display screen 5 to come into contact with the internal components. Therefore, the preset distance between the buffer portion and the display screen 5 aims to prevent the display screen 5 from coming into contact with the internal components or a specific distance between the display screen and the internal components. As long as the buffer portion can guarantee that, under the action of the external pressure, the support component 4 can improve the bending strength of the connected side wall so that the display screen 5 does not come into contact with the internal components (the distance between the buffer portion and the display screen 5 is within an allowable range), no specific limitation is made herein.

Optionally, for the disposed support component 4 to improve the bending strength of the corresponding position of the side wall when being connected to the corresponding position of the housing 1, the support component 4 and the first side wall 14 are integrally formed, and the support component 4 and the second side wall 13 are integrally formed. Through integral molding, the stability of the connection between the support component 4 and the side walls is improved, and the support effect of the support component 4 on the side walls is improved, so that the side wall can achieve better bending resistance without increasing own thickness or height, avoiding contact of the display screen 5 with the internal components under pressure.

Figure 3:
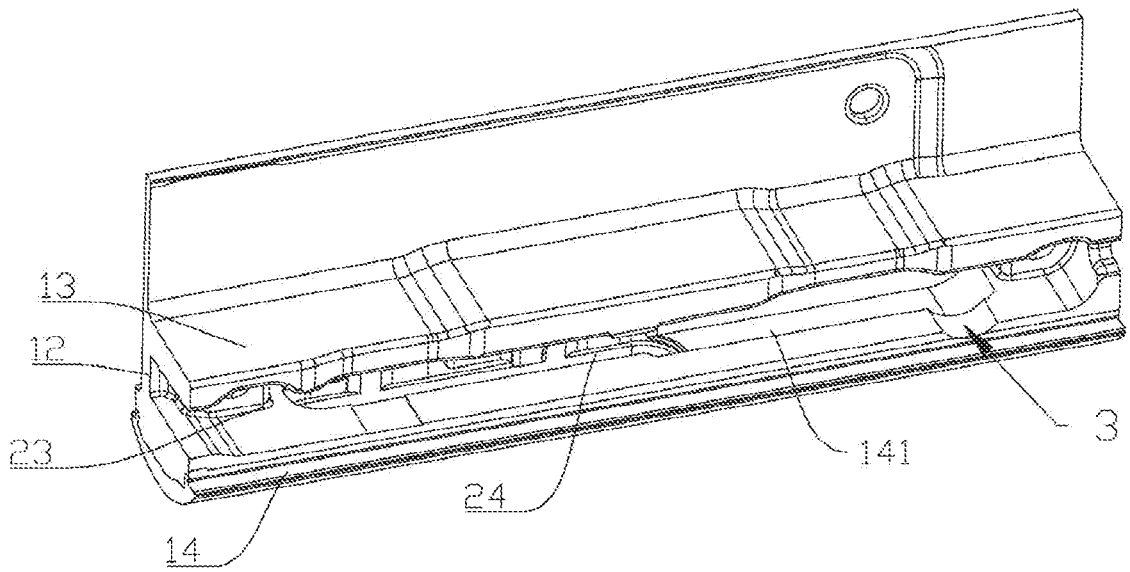
FIG. 3 is a schematic structural diagram of FIG. 2 in a direction with the trigger portion being removed.
Figure 10:
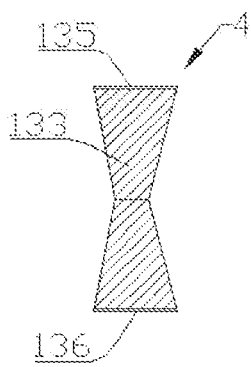
FIG. 10 is a cross-sectional view of still another support component along the second direction L according to an embodiment of this application.

In a specific implementation provided in this application, as shown in FIG. 3 and FIG. 4, for the disposed support component 4, when being connected to the corresponding position of the side wall, the support component 4 can improve the bending strength of the side wall, and the arrangement of the support component 4 does not increase the height or width of the corresponding side wall. For the disposed support component 4 and the buffer portion disposed thereon, a variety of different structural fit can be adopted, and specifically, the following manners can be included:

In a specific implementation, as shown in FIG. 10, along the thickness direction H of the housing 1, the support component 4 includes a first connection end 135 and a second connection end 136, and there is an intermediate section 133 between the first connection end 135 and the second connection end 136; along a thickness direction H of the housing 1, the second connection end 136 is configured to connect a bottom wall 12 of the housing 1, and the first connection end 135 is configured to connect the display screen 5; a cross-sectional area of the first connection end 135 is S1, a cross-sectional area of the second connection end 136 is S2, a minimum cross-sectional area of the intermediate section 133 is S3, S3<S1, and S3<S2; and the buffer portion is formed at a position at which a cross section of the intermediate section 133 is S3. In this structural fit, the first connection end 135 and the second connection end 136 are respectively used to connect the corresponding side walls, so that the support component 4 is disposed along the thickness direction H of the housing 1. Along the thickness direction H, the first connection end 135 and the second connection end 136 are respectively located on two end surfaces of the corresponding side walls. When the side wall is under pressure, the corresponding connection end can transmit the force to the intermediate section 133, and the buffer portion disposed in the intermediate section 133 can buffer the transmitted pressure to distribute the stress, thereby improving the bending strength of the side wall. Specifically, it can be understood that, along the thickness direction H, when the same pressure is applied to the housing 1 and the display screen 5, for the side wall without the support component 4, since the cross-sectional area of each part is equal along the thickness direction H, the bending stress is that the axial pressure is in the cross-sectional area. When the support component 4 with variable cross-section is disposed on the side wall, along the thickness direction H of the housing 1, the cross-sectional area of the connection ends on both sides is larger than the minimum cross-sectional area of the intermediate section 133. Since the position of the buffer portion is in the minimum cross-sectional area, under this limitation, the bending stress is greater. It can be learned that, the cross-sectional area of the corresponding position of the buffer portion is reduced, so that the rigidity of the support component 4 can be improved, and then the connected side wall has better bending resistance.

Specifically, for the disposed intermediate section 133 to form the buffer portion at the position of the minimum cross-sectional area and connect the first connection end 135 and the second connection end 136 to improve the stability of the connection, as shown in FIG. 10, along the thickness direction H of the housing 1, the sectional area of the intermediate section 133 gradually increases from the buffer portion to the first connection end 135, and the sectional area of the intermediate section 133 gradually increases from the buffer portion to the second connection end 136. Through such an arrangement that the cross-sectional area of the support component 4 gradually increases from the buffer portion at the middle position to two ends, the structural stability of the support component 4 can be improved while ensuring good rigidity.

Optionally, for the disposed support component 4, according to different positions and sizes of the disposed side wall, to prevent the disposed support component 4 from protruding from the side wall, the support component 4 may be in different shapes, that is, the shape of the cross section of the support component 4 includes a circle, an ellipse, a quadrangle, a polygon, and a rhombus, which is not specifically limited herein.

Figure 8:
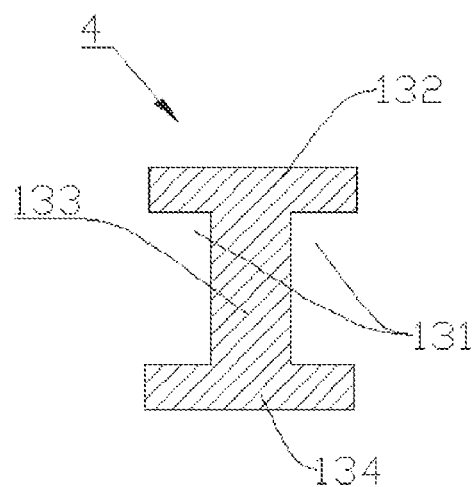
FIG. 8 is a cross-sectional view of a support component along the second direction L according to an embodiment of this application.
Figure 9:
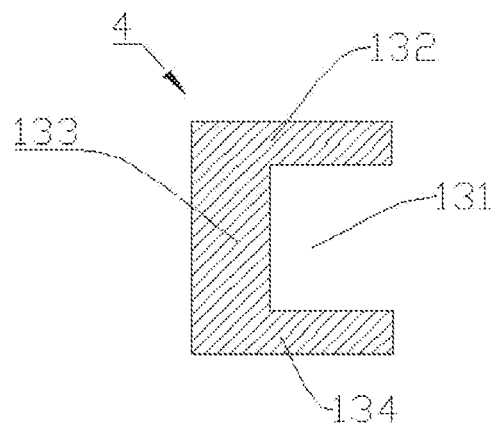
FIG. 9 is a cross-sectional view of another support component along the second direction L according to an embodiment of this application.

In another specific implementation, as shown in FIG. 8 and FIG. 9, for the disposed support component 4, to improve the bending strength of the corresponding side wall position, the support component 4 is provided with a recessed portion 131, and the recessed portion 131 forms the buffer portion. Through the arrangement of the recessed portion 131, at this position, along the thickness direction H of the housing 1, the cross-sectional area of the support component 4 at the position of the recessed portion 131 is smaller than cross-sectional areas of other positions. When the support component 4 is connected to the corresponding side wall, along the thickness direction H of the housing 1, the cross-sectional area of the middle position is smaller than the cross-sectional area of the parts that bear external pressure at both ends, so that when the external pressure is transmitted to the position where the recessed portion 131 is disposed, the change of the cross-sectional area at the position of the recessed portion 131 can increase the bending stress.

Specifically, for the recessed portion 131 to exert a better effect when being disposed on the side wall to improve the bending resistance of the side wall, along a second direction, a cross-sectional area of the first side wall 14 is S4, the recessed portion 131 disposed on the first side wall 14 has a cross-sectional area S5, and S5 does not exceed one-third to one-fourth of S4; and along the second direction L, a cross-sectional area of the second side wall 13 is S6, the recessed portion 131 disposed on the first side wall 14 has a cross-sectional area S7, and S7 does not exceed one-third to one-fourth of S6. With the arrangement within this range, when the support component 4 is correspondingly disposed on the first side wall 14 and/or the second side wall 13, a better support effect can be achieved and the bending resistance of the side wall can be improved.

Optionally, for the recessed portion 131 disposed on the support component 4 to exert a better effect when the recessed portion 131 is connected to the corresponding side wall so that the bending resistance of the side wall is better, the support component 4 includes a first section 132 and a second section 134, and an intermediate section 133 is connected between the first section 132 and the second section 134. Along the thickness direction H of the housing 1, the recessed portion 131 is located between the first section 132 and the second section 134, the first section 132 is configured as a side wall of the recessed portion 131 near the display screen 5, the second section 134 is connected to a bottom wall 12 of the housing 1, a side wall corresponding to the position of the recessed portion 131 is the intermediate section 133, a length of the intermediate section 133 does not exceed one-fourth of a length of the first section 132, and a length of the second section 134 is not less than a thickness of the bottom wall 12.

It should be emphasized herein that for the support component 4 and the buffer portion disposed thereon, a matching structure used can be adjusted according to the actual use situation. The foregoing matching structure may be used, or other structures may be used, which is not specifically limited herein as long as the bending resistance of the connected side walls can be improved through the support component 4 and the buffer portion disposed thereon.

In a specific implementation of this application, as shown in FIG. 2 and FIG. 4, in the accommodation cavity 23 formed between the first side wall 14 and the second side wall 13, the first side wall 14 and the second side wall 13 are weaker than other side walls. Therefore, the support component 4 may be considered to be disposed at other positions of the side wall while arranging the support component 4 on the first side wall 14 and/or the second side wall 13. When the support component 4 is disposed on the first side wall 14 and/or the second side wall 13, to enable the accommodation cavity 23 to have a larger accommodation space, the buffer portion may be disposed as the recessed portion 131. Along the first direction, the recessed portion 131 is a groove structure provided on a side of the first side wall 14 close to the accommodation cavity 23, and/or, the recessed portion 131 is a groove structure provided on a side of the second side wall 13 close to the accommodation cavity 23. Through the arrangement of such a recessed portion, while the bending strength of the corresponding side walls can be improved, the accommodation space of the accommodation cavity 23 can be increased.

Figure 5:
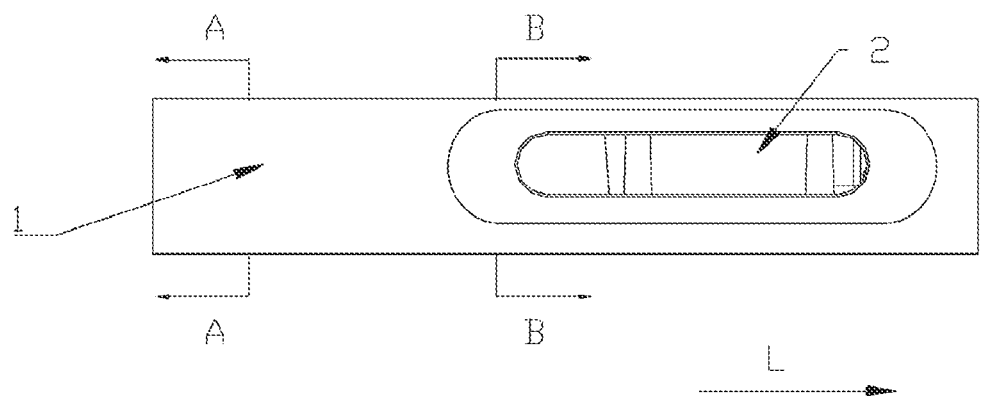
FIG. 5 is a partial main view of a position of a trigger portion disposed in a housing of a mobile terminal according to an embodiment of this application, where a direction indicated by an arrow L is a second direction L, and a direction indicated by an arrow H is a thickness direction.

As shown in FIG. 5, when the support component 4 is disposed on the first side wall 14 and the second side wall 13, to enable the support component 4 to achieve a better support effect and improve the bending resistance of the side wall, for the support components 4 respectively disposed on the first side wall 14 and the second side wall 13, along the first direction W, the support components 4 are not overlapped or partially overlapped. Through the at least incompletely overlapped arrangement, the support components 4 are combined to act, and disperse, when subjected to external pressure, the generated stress so as not to concentrate on one support component 4 or the buffer portion of one support component 4. In this way, when the pressure along the thickness direction H is applied, the stress can be dispersed to ensure that the matching support components 4 have better bending resistance. Preferably, the support components 4 disposed on the first side wall 14 and the second side wall 13 are disposed in a completely non-overlapping manner, and a larger distance between two closest support components 4 projected onto a plane along the first direction W indicates that more stress can be dispersed on the corresponding side wall, so that the bending resistance of the side wall can be improved. However, the maximum distance between the support components 4 needs to be based on the fact that the support components 4 can cooperate to disperse the stress, rather than increasing infinitely.

Figure 7:
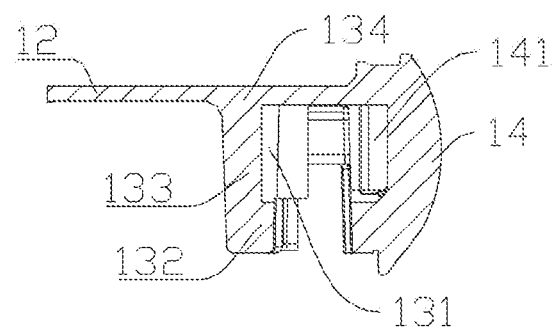
FIG. 7 is a cross-sectional view of a direction B in FIG. 5.

Specifically, as shown in FIG. 2, FIG. 3, and FIG. 7, in the structural fit of the accommodation cavity 23 movably connected to the trigger portion 2, for the accommodation cavity to accommodate at least part of the trigger portion 2, and to realize that the action of the trigger portion 2 can make unlock the display screen 5, the trigger portion 2 includes a connected cable board, where the cable board is electrically connected to the circuit board controlling the display screen 5 through a cable. In the accommodation cavity 23, the arrangement of the corresponding switch 22, bracket 21, and other structures takes up most of the space. To mount the cable board, and for the placement position of the cable board not to affect the movement of the corresponding bracket 21 and other structures, the first side wall 14 is provided with an avoidance groove 141. The avoidance groove 141 is disposed on a side close to the accommodation cavity 23 and is in communication with the accommodation cavity 23. The avoidance groove 141 is used to accommodate the cable board. The avoidance groove 141 generally runs through the first side wall 14 along the thickness direction H of the housing 1. In this structural fit, the disposed avoidance groove 141 reduces the bending strength of the corresponding first side wall 14 and the second side wall 13. In addition, the avoidance groove is disposed when the distance between the first side wall 14 and the second side wall 13 is small. To facilitate processing, numerical control machining is generally selected, and in numerical control machining, to process the avoidance groove 141, when the distance between the first side wall 14 and the second side wall 13 is small, and a cutter for processing the groove starts processing at the initial position, it is easy to touch the inner wall of the second side wall 13, so that a first cut on the second side wall 13 appears. In this structure, when the housing 1 is subjected to the pressure in the thickness direction H, under the action of the stress, the position of the first cut is easy to be torn, so that the structural stability of the housing 1 is destroyed, which affects the performance of the terminal device. To avoid such problems, the support component 4 may be disposed on the second side wall 13, and the groove structure provided by the buffer portion in the support component 4 can at least be disposed at the position where the first cut can be produced when the avoidance groove 141 is processed. Therefore, the disposed groove structure can be used as a buffer portion to improve the bending strength of the side wall, and can also avoid the cutter, to prevent a first cut being generated when the avoidance groove 141 is processed, improving the structural stability of the housing 1.

Optionally, the groove structure has an inner wall. Since the groove structure is at least disposed in the second side wall 13 at the corresponding feed position when the cutter processes the avoidance groove 141. To facilitate working, before processing the avoidance groove 141 by the cutter, the groove structure is first processed at the corresponding position to form the support component 4. To facilitate processing, the groove structure also uses numerical control machining, and the cutter selects a size suitable for processing the groove structure. To facilitate processing, the inner wall of the groove structure may be disposed as the same arc-shaped surface as a selected cutter, to reduce processing costs.

Figure 6:
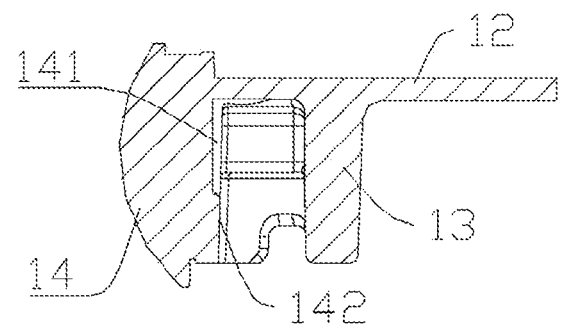
FIG. 6 is a cross-sectional view along a direction A in FIG. 5.

More specifically, as shown in FIG. 4 and FIG. 6, when processing the avoidance groove 141, after processing by the cutter, the cutter may easily touch the edge position at a side of the groove structure away from the bottom wall 12 of the housing 1 in the first side wall 14 during the movement of the cutter to form a second cut. Similarly, to prevent the second cut from being easily torn under pressure, a reinforcing portion 3 is disposed at this position, the reinforcing portion 3 is a groove 142 provided on the first side wall 14, and the groove 142 is in communication with the avoidance groove 141. In a direction from the accommodation cavity 23 to the first side wall, a recessed depth of the groove 142 is less than a recessed depth of the avoidance groove 141. A groove 142 is provided at a position corresponding to a second cut, and the groove 142 is in communication with the avoidance groove 141, to prevent the cutter from colliding with the first side wall 14 to form the second cut in a process of being drawn out from the avoidance groove 141, providing a buffer space for the cutter to be drawn out.

In addition, the reinforcing portion 3 is disposed as the structure of the groove 142, and the depth of the groove 142 is smaller than the depth of the avoidance groove 141 in the direction from the accommodation cavity 23 to the first side wall 14, for the groove to be the same as the groove structure of the support component 4 disposed at the first cut. Similarly, through the combination of the groove 142 and the avoidance groove 141, along the thickness direction H of the housing 1, a structure with large cross-sectional areas at two ends and a small cross-sectional area in the middle is formed in the first side wall 14 to avoid the reduction of the rigidity of the first side wall 14 due to the setting of the groove to avoid the formation of the second cut. Through the combination of the groove 142 and the avoidance groove 141, viewed from the second direction L, the cross section of this part is similar to an "I"-shaped structure, which reduces the requirements on the yield strength of the material and achieves better bending resistance.

In the first side wall 14 and the second side wall 13, as shown in FIG. 6 and FIG. 7, to avoid the generation of a cut and reduce the rigidity of the side wall, the support component 4 and the reinforcing portion 3 are respectively disposed at least at the positions corresponding to the first cut and the second cut. In addition, for the arrangement of the groove structure of the two, along the second direction L, the cross sections corresponding to the positions of the support component 4 and the reinforcing portion 3 are all in the "I" shape. Such a structure has good stability, lowers the yield strength requirements of the material, and improves the bending resistance of the side wall. In addition, along the second direction L, the reinforcing portion 3 does not overlap the support component 4. Through the non-overlapping arrangement with staggered positions, the stress is dispersed, avoiding stress concentration that leads to local deformation due to excessive pressure.

It should be emphasized herein that for the support component 4, according to the use requirements of mobile terminals of different specifications, the bending strength required by the housing 1 is also different, and to ensure a better use effect, the support component 4 may be disposed at different positions on the side wall. The stress is dispersed through the combination of the support components 4, avoiding stress concentration that leads to local deformation due to excessive pressure. In addition, to ensure that the support component 4 can achieve better bending resistance on the side wall, according to side walls with different sizes and shapes, the specific structure of the support component 4 is different. Therefore, the arrangement quantity and arrangement form of the support components 4 on the side wall and the specific structure of the buffer portion disposed in the support components 4 may be adjusted adaptively according to the actual situation, and are not specifically limited herein.

The foregoing descriptions are merely preferred embodiments of this application and are not intended to limit this application. For a person skilled in the art, this application may have various modifications and changes. Any modification, equivalent replacement, or improvement made without departing from the spirit and principle of this application shall fall within the protection scope of this application.

What is claimed is:

1. A mobile terminal, comprising:
   a housing having a side wall that is provided with an accommodation cavity, wherein the accommodation cavity has a first side wall and a second side wall, the first side wall is provided with an avoidance groove, and the avoidance groove is disposed on a side of the first side wall close to the accommodation cavity and is in communication with the accommodation cavity;
   a display screen, mounted in the housing; and
   a trigger portion that at least partly protrudes through the first side wall into the accommodation cavity and is movably connected to the accommodation cavity, wherein the trigger portion comprises a cable board, wherein the avoidance groove is configured to accommodate the cable board.

2. The mobile terminal of claim 1, wherein the first side wall or the second side wall comprises a first connection end and a second connection end, and there is an intermediate section between the first connection end and the second connection end, wherein along a thickness direction H of the housing, the second connection end is configured to connect a bottom wall of the housing, and the first connection end is configured to connect the display screen, wherein a cross-sectional area of the first connection end is S1, a cross-sectional area of the second connection end is S2, a minimum cross-sectional area of the intermediate section is S3, S3<S1, and S3<S2, and wherein a buffer portion is formed at a position at which a cross section of the intermediate section is S3.

3. The mobile terminal of claim 2, wherein along the thickness direction H of the housing, a sectional area of the intermediate section gradually increases in a direction from the buffer portion to the first connection end, and the sectional area of the intermediate section gradually increases in a direction from the buffer portion to the second connection end.

4. The mobile terminal of claim 1, further comprising a support component disposed on at least one of the first side wall or the second side wall, wherein the support component is provided with a buffer portion, and there is a preset distance between the buffer portion and the display screen.

5. The mobile terminal of claim 4, wherein the support component is provided with a recessed portion, and the recessed portion forms a buffer portion.

6. The mobile terminal of claim 5, wherein along a second direction L, a cross-sectional area of the first side wall is S4, wherein the recessed portion is disposed on the first side wall and has a cross-sectional area S5, and S5 does not exceed one-third to one-fourth of S4, and wherein along the second direction L, a cross-sectional area of the second side wall is S6, the recessed portion disposed on the first side wall has a cross-sectional area S7, and S7 does not exceed one-third to one-fourth of S6.

7. The mobile terminal of claim 5, wherein along a first direction W, the recessed portion is either a) a groove structure provided on a side of the first side wall close to the accommodation cavity, or b) a groove structure provided on a side of the second side wall close to the accommodation cavity.

8. The mobile terminal of claim 7, wherein the groove structure has an inner wall, and the inner wall is an arc-shaped surface.

9. The mobile terminal of claim 7, wherein the support component is disposed on the first side wall and the second side wall, and wherein along the first direction W, the support component is not overlapped or partially overlapped.

10. The mobile terminal of claim 7, wherein the support component is disposed on the second side wall, and along the first direction W, a projection of the avoidance groove on the second side wall can cover at least part of the support component.

11. The mobile terminal of claim 10, further comprising a reinforcing portion, wherein the reinforcing portion is a groove provided on the first side wall, and the groove is in communication with the avoidance groove, and wherein in a direction from the accommodation cavity to the first side wall, a recessed depth of the groove is less than a recessed depth of the avoidance groove.

12. The mobile terminal of claim 11, wherein along the second direction L, the reinforcing portion does not overlap the support component.

13. The mobile terminal of claim 5, wherein the support component comprises a first section and a second section, and an intermediate section is connected between the first section and the second section, and wherein along a thickness direction H of the housing, the recessed portion is located between the first section and the second section, the first section is configured as a side wall of the recessed portion near the display screen, the second section is connected to a bottom wall of the housing, a side wall corresponding to a position of the recessed portion is the intermediate section, a length of the intermediate section does not exceed one-fourth of a length of the first section, and a length of the second section is not less than a thickness of the bottom wall.

14. The mobile terminal of claim 5, wherein a cross-sectional area of the support component at a position of the recessed portion is less than a cross-sectional area of the support component at a position other than that of the recessed portion.

15. The mobile terminal of claim 4, wherein the support component is integrally formed with the first side wall, and the support component is integrally formed with the second side wall.

16. The mobile terminal of claim 4, wherein the support component comprises a first connection end and a second connection end, and there is an intermediate section between the first connection end and the second connection end, wherein along a thickness direction H of the housing, the second connection end is configured to connect a bottom wall of the housing, and the first connection end is configured to connect the display screen, wherein a cross-sectional area of the first connection end is S1, a cross-sectional area of the second connection end is S2, a minimum cross-sectional area of the intermediate section is S3, S3<S1, and S3<S2, and wherein a buffer portion is formed at a position at which a cross section of the intermediate section is S3.

17. The mobile terminal of claim 16, wherein along the thickness direction H of the housing, a sectional area of the intermediate section gradually increases in a direction from the buffer portion to the first connection end, and the sectional area of the intermediate section gradually increases in a direction from the buffer portion to the second connection end.

18. The mobile terminal of claim 4, wherein a cross-sectional shape of the support component is one of a circle, an ellipse, a quadrangle, a polygon, and a rhombus.

19. The mobile terminal of claim 1, further comprising a reinforcing portion, wherein the reinforcing portion is a groove provided on the first side wall, and the groove is in communication with the avoidance groove, and wherein in a direction from the accommodation cavity to the first side wall, a recessed depth of the groove is less than a recessed depth of the avoidance groove.

20. The mobile terminal of claim 19, wherein along a second direction L, the reinforcing portion does not overlap a support component disposed on at least one of the first side wall or the second side wall.

* * * * *